United States Patent [19]

Desjardins

[11] 4,372,431

[45] Feb. 8, 1983

[54] SIX AXIS VIBRATION ISOLATION SYSTEM

[75] Inventor: Rene A. Desjardins, Media, Pa.

[73] Assignee: The Boeing Company, Philadelphia, Pa.

[21] Appl. No.: 91,437

[22] Filed: Nov. 5, 1979

[51] Int. Cl.³ .............................................. F16F 7/10
[52] U.S. Cl. ................................. 188/380; 244/17.27
[58] Field of Search .............. 188/1 B, 378, 379, 380; 244/17.27; 74/574; 416/144, 145

[56] References Cited

U.S. PATENT DOCUMENTS 3,921,940 11/1975 Mouille ........................... 244/17.27
4,088,042 5/1978 Desjardins et al. ................. 188/1 B

OTHER PUBLICATIONS

*Advanced Development of a Helicopter Rotor Isolation System for Improved Reliability,* vol, 1, Kaman Aero. Corp., Dec. 1977, pp. 28-37.

*Primary Examiner*—Duane A. Reger
*Attorney, Agent, or Firm*—Jones, Tullar & Cooper

[57] ABSTRACT

A six axis vibration isolation system, which includes four bi-directional vibration isolators, each having a spring arm and an inertia arm which extend along a longitudinal axis between a body and a vibrating mass. The spring arm is pivotally attached to the body by a spherical bearing, and the inertia arm is pivotally attached to both the body and the vibrating mass by spherical bearings, which allow the vibration isolator to attenuate vibrations in any direction orthogonal to its longitudinal axis. The four isolators are symmetrically disposed about the vertical, or yaw axis of the body, with each pair of diametrically opposite isolators having horizontally disposed, parallel axes which are orthogonal to the horizontal parallel axes of the other pair of isolators, with each pair of isolators extending in opposite directions, and with the fuselage pivot points of the inertia arms of all four isolators being equidistant from the yaw axis, to isolate the body from linear vibratory forces in three mutually orthogonal directions and from vibratory moments about three mutually orthogonal axes.

37 Claims, 10 Drawing Figures

SIX AXIS VIBRATION ISOLATION SYSTEM

BACKGROUND OF THE INVENTION

1. Field of the Invention:

This invention relates to a vibration isolation system and particularly to such a system wherein inertia forces resulting from vibration-induced acceleration of an inertia mass that is mounted on the vibrating body are transmitted back to the body to oppose and reduce the effects of the undesired vibration.

2. Description of the Prior Art:

A spectrum of vibratory displacement and rotational motion about three mutually perpendicular axes, namely, the pitch, roll and yaw axes of a helicopter is descriptive of the operating environment in which a helicopter rotor, and the transmission to which it is attached, must operate. Vibration induced accelerations of the rotor produce displacements and rotations about the principal axes of the helicopter which must be attenuated, preferably within the rotor-transmission assembly, to avoid the undesirable vibratory accelerations from being transmitted to the fuselage structure to which the transmission is attached. To reduce the vibration effects to the helicopter structure requires, then, isolation of six degrees of freedom.

It is well known that the helicopter structure vibrating at a substantially constant frequency through the forcing effect of a vibrating rotor-transmission assembly to which the fuselage is attached may be effectively isolated from the forced vibration spectrum imposed by the rotor by interposing a second mass, upon which the induced accelerations are applied, provided the second mass can transmit its inertia forces to the helicopter structure. In this way, the inertia forces of the second mass can be made to oppose the directional sense of the induced vibration by tuning the natural frequency of the second mass isolator system to the principal frequency of the induced vibration. To the extent that the fuselage structure receives inertia forces from the second mass that are in phase with, oppositely directed to and of equal magnitude with the rotor loads carried to the fuselage, the isolation system can dynamically uncouple the rotor and the fuselage.

However, isolation systems of this kind are capable of isolating the vibration induced effects generally about one axis of the helicopter; vibration accelerations about the remaining axes and the displacement forces directed parallel to these axes require additional isolators. For example, U.S. Pat. No. 4,088,042, issued May 8, 1978 to myself and others, and my U.S. Pat. No. 4,140,028, issued Feb. 20, 1979 disclose vibration isolation systems which include a plurality of single direction isolators.

OBJECTS AND SUMMARY OF THE INVENTION

Therefore, it is an object of the invention to provide a vibration isolator for isolating vibration about two orthogonal axes.

It is another object of this invention to provide an effective vibration isolation system for all six axes: vertical, lateral, longitudinal, pitch, roll and yaw, without incurring a weight penalty.

The vibration isolation system according to a first aspect of this invention, provides rotor isolation of displacement forces directed parallel to the orthogonal axes of the helicopter and of rotational accelerations about the three principal axes. This result is accomplished through an arrangement of four inertia weights that are angularly positioned 90° apart, in the plane of the pitch and roll axes, and mounted resiliently from a transmission support and a fuselage support. A spring arm, whose bending stiffness may be adjusted by altering its cross-section to aid in tuning the system, extends radially outwardly from the rotor center. The arm is supported at each axial end on the transmission structure. An inertia arm or shell suspends the inertia mass either outboard from the outermost transmission support or inwardly therefrom, in a size-reducing modification of the system. The inertia arm is supported both from the outer transmission attachment and from a fuselage mount located immediately outboard of the transmission support.

The four isolator arms can respond to vertically induced vibrations, rotation about the yaw or vertical axis and forced motion resulting from inplane vibration parallel to the pitch and roll axes. The system responds to forced vibration of the rotor tending to induce rotation about the pitch or roll axes by inducing oppositely directed vertical motion of the inertia masses that are located on opposite sides of the axis about which rotation is being induced.

A second aspect of the invention provides for the rotor loads to be transmitted to the transmission and for the transmission-rotor assembly to be resiliently suspended by the radially directed spring arms which are mounted at their outboard ends to the fuselage structure. The rotor isolation system, in this instance, includes an inertia shell that extends inwardly from its dual support on the transmission arm and fuselage mount and on which is attached the inertia mass.

The invention will be better understood and further objects and advantages thereof will become more apparent from the following detailed description of preferred embodiments taken in conjunction with the drawings.

DESCRIPTION OF THE PREFERRED EMBODIMENT

Figure 1:
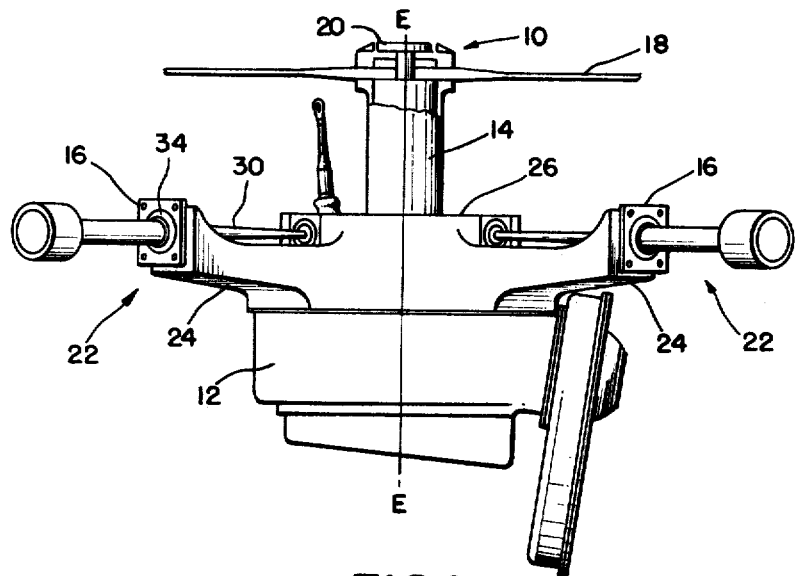
FIG. 1 is an elevation view of a helicopter rotor-transmission assembly showing a vibration isolation system mounted to the transmission and fuselage.
Figure 2:
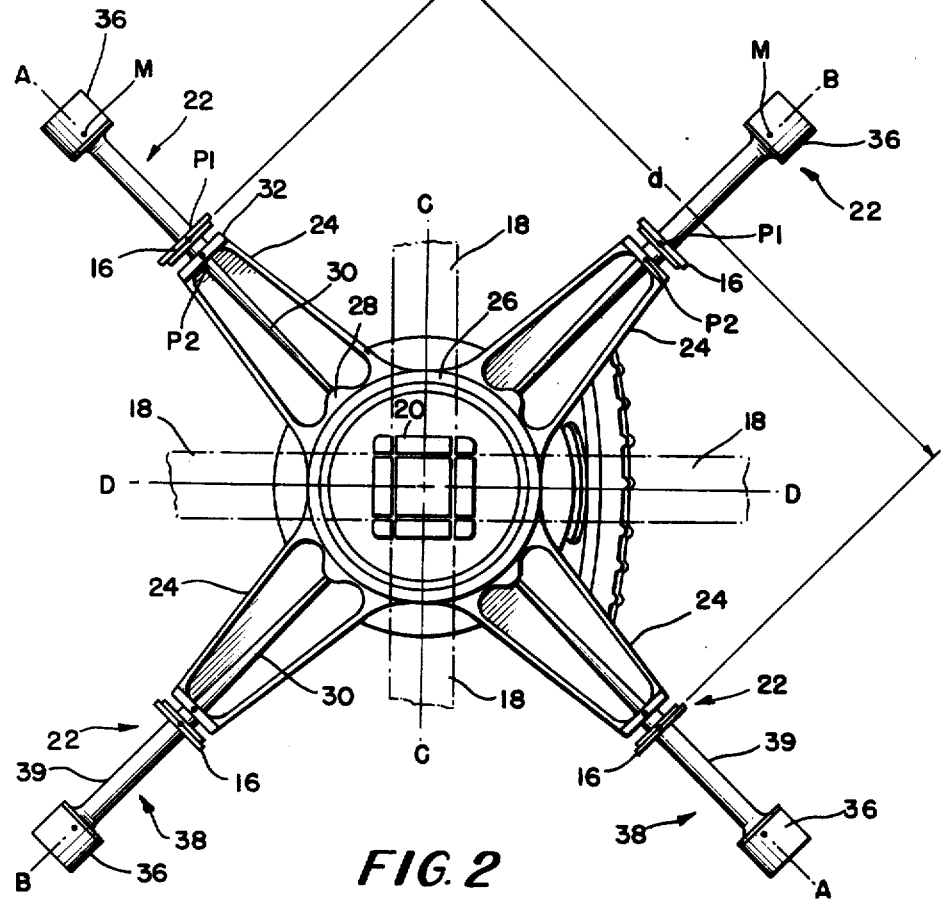
FIG. 2 is a plan view of the helicopter rotor-transmission assembly and vibration isolation system of FIG. 1.

Referring first to FIGS. 1 and 2, the rotor 10 and transmission casing 12 of a helicopter are shown joined by a rotor shaft 14, the transmission casing 12 being mounted securely to the fuselage (not shown) at mounting flanges 16, each of which provide a bolt pattern for assembly by mechanical attachments to the fuselage structure. The rotor blades 18 extend radially outwardly from the rotor center and are mounted to the rotor shaft 14 by bolting a fitting 20 to the upper end of the rotor shaft 14. An isolation system according to this invention includes four two-directional vibration isolators 22 which are respectively mounted on four radially directed arms 24 that extend from the transmission casing 12. The four arms 24 are symetrically disposed at 90° intervals about the rotor shaft 14 so that two arms extend in opposite directions along a first horizontal axis A—A, and the other two arms 24 extend in opposite directions along a second horizontal axis B—B orthogonal to the first axis. As illustrated in FIG. 2, the arms 24 straddle both the roll axis C—C and the pitch axis D—D of the helicopter and are positioned at approximately 45 degrees from these axes. However, the arms 24 may be arbitrarily positioned at any angle relative to the roll and pitch axes of the helicopter without affecting the operation of the vibration isolation system, so long as the 90° spacing between adjacent arms 24 is maintained. The rotor shaft 14 is mounted within the transmission casing 12 on bearings that permit relative rotation therebetween but which react and transmit to the transmission casing 12 all linear forces (vertical, longitudinal and lateral) and all moments (roll, pitch and yaw) present in the rotor 10.

Figure 3:
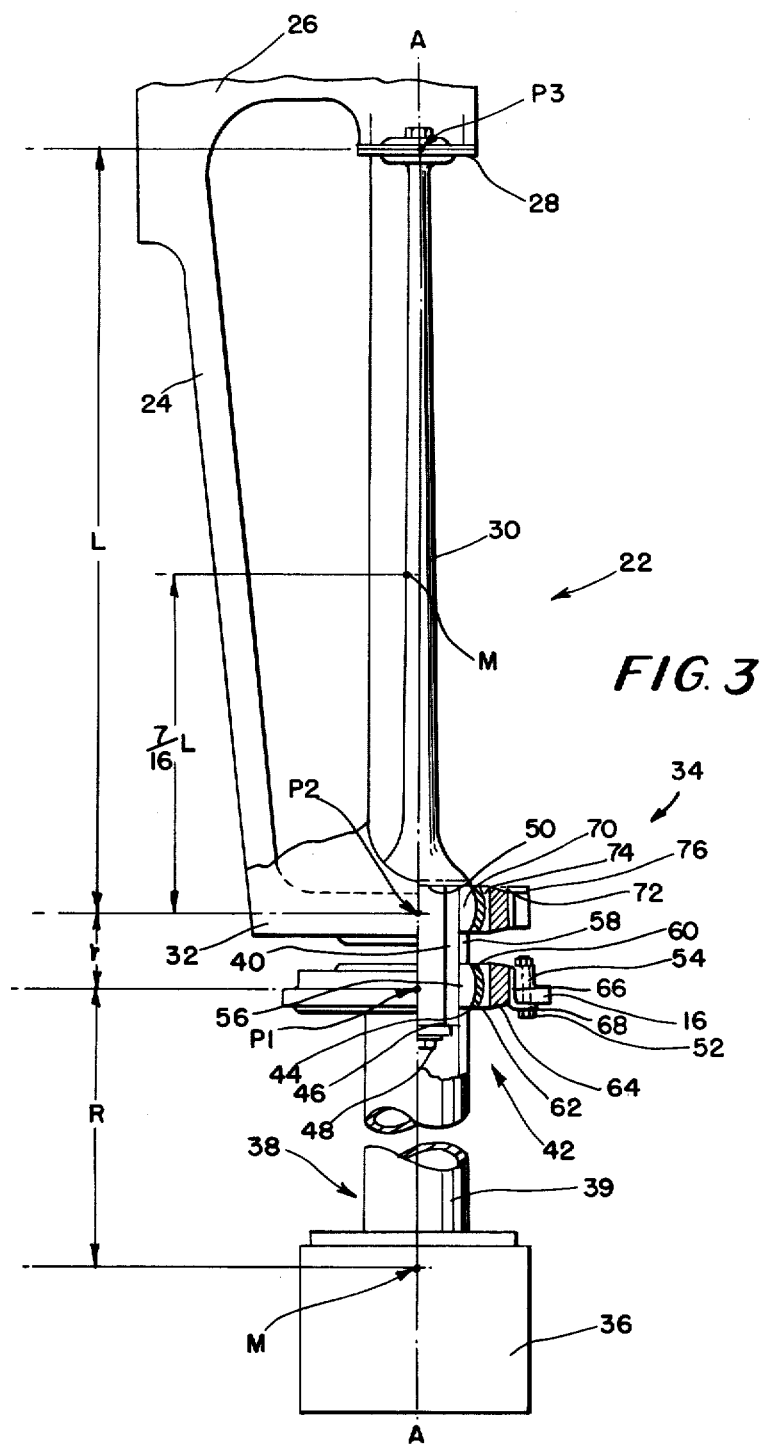
FIG. 3 is a plan view partially in section of a bi-directional vibration isolator of the system of FIG. 1 in position and mounted on an arm of the transmission casing.

The transmission casing 12 includes a ring portion 26 at its upper end defining four inner mounting flanges 28 to which four spring arms 30 are respectively attached at their inner ends. The spring arms 30 may be tapered to have an outer end cross-section larger than the inner end cross-section, as best illustrated in FIG. 3. In such a case, the center of gravity m of the spring arm 30 will be disposed closer to its outer end than to its inner end. The radial arms 24 are integral with the ring portion 26, extend outwardly therefrom, and terminate in a flange 32 which furnishes a mount for a bearing assembly 34.

An inertia mass 36 of an inertia arm 38 is fixed to or made integrally with an outer end of a cylindrical tubular portion 39 of the inertia arm which extends outwardly from the flange 32, whereby the center of gravity M of the inertia arm 38 is disposed near the outer end of the inertia arm 38. The inertia arm 38 is formed with a thickened inner wall end portion 40 that is mounted within the bearing assembly 34 and within a second bearing assembly 42 that is positioned adjacent and immediately outboard of bearing assembly 34. The end portion 40 defines a shoulder 44 that abuts the bearing assembly 42 and a second inner shoulder 46, which provides a mounting surface for a mechanical attachment 48 that engages screw threads formed on the outermost portion (not shown) of the spring arm 30. A mounting surface 50 positioned immediately inboard of the bearing assembly 34 abuts the end of the end portion 40 of the inertial arm 38 and the mechanical attachment 48, upon being drawn up, maintains the spring arm 30 and inertial arm 38 joined in position at the mounting surface 50.

The bearing assembly 42 is mounted within a central circular opening formed through the thickness of the mounting flange 16. Provision is made in the flange 16, at each corner thereof, for a bolt 52 to enter through a hole 54 and for the flange 16 to be attached to the helicopter fuselage in this way. The bearing assembly 42 includes an inner race 56 that abuts the shoulder 44 at its outboard side and a sleeve 58 positioned between bearings 34 amd 42 at its inboard side. The inner surface of the race 56 is a cylindrical surface for engagement with the end portion 40 of the inertia arm 38. The outer surface of the inner race 56 is a spherical surface comprising a portion of a sphere having its center at the central axis of the bearing assembly 42. Joined to the outer surface of the inner race 56 is a laminated, spherical bearing 60 formed of alternating lamina of elastomeric material and metal which similarly produces an outer surface in the form of a sphere having its center at the central axis of the bearing assembly 42. An intermediate race 62 formed of metal is joined to this surface and provides a transition through its radial thickness so that an outer circular cylindrical surface, generally parallel to the outer surface of the end portion 40, results. Joined to this surface is a cylindrical laminated bearing 64 formed of successive lamina of elastomeric material and metal, which laminate produces a cylindrical outer surface to which the outer race 66 is joined. The outer race 66 has an angular cross-section, the outstanding leg 68 of which provides a surface that nests around the mounting flange 16 and through which the attachment bolts 52 extend.

Thus, the bearing assembly 42 is a combination of: (1) an outer cylindrical bearing having an inner race (the intermediate race 62) which is translatable with respect to the fuselage along a horizontal axis of the fuselage; and (2) a concentrically disposed, inner spherical bearing having an outer race (the intermediate race 62) with respect to which the inertia arm 38 is pivotable about a first pivot point P1 of the inertia arm 38.

The bearing assembly 34 is similiar in construction to the bearing assembly 42 and includes concentrically disposed inner and outer bearings. The inner bearing is a spherical bearing having an inner race 70 affixed about the inertia arm 38 to allow pivotal movement of the inertia arm 38 about a second pivot point P2 of the inertia arm 38. The outer bearing is a cylindrical bearing having an outer race 72 affixed to the transmission arm 24. An intermediate race 74 serves as both the outer race of the spherical bearing and the inner race of the cylindrical bearing.

The inner race 70 is positioned between and in abutting engagement with the mounting surface 50 and the end of sleeve 58 when the attachment 48 is drawn up. The outer race 72 terminates in an angle whose outstanding leg 76 provides a surface that can be mechanically joined to the flange 32 of the transmission radial arm 24.

The cylindrical outer bearings of the bearing assemblies 34 and 42 allow linear movement of the transmission casing 12 with respect to the fuselage along the horizontal axis A—A of the transmission arm 24, and also allow linear movement of the transmission casing 12 with respect to the fuselage orthogonally of the horizontal axis A—A of the arm 24, without binding of the inertia arm 38 within the spherical bearings of the bearing assemblies 34 and 42. If desired, only one of the bearing assemblies 34 and 42 need include a cylindrical bearing to allow such linear movement of the transmission casing 12 with respect to the fuselage.

The spherical inner bearings of the bearing assemblies 42 and 34 determine the fixed pivot points P1 and P2, respectively, of the inertia arm 38, so that the ratio R/r of the distance R between the center of gravity M of the inertia arm 38 and the pivot point P1 of the inertia arm 38 relative to the fuselage and the distance r between the pivot point P1 and the pivot point P2 of the inertia arm 38 relative to the transmission casing 12 is a predetermined fixed value.

Figure 4:
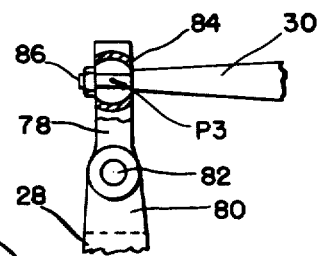
FIG. 4 is a side elevation view of a foreshortening link and radially inboard end of the spring arm.

The inboard end of the spring arm 30 may terminate in a foreshorting link 78, a typical example of which is shown in FIG. 4, that accommodates the reduction in length of the radial projection of the spring arm 30 as a result of in-plane and normal-plane bending of the spring arm 30 in operation. In this case, the inner mounting flange 28 is a clevis that receives one end of the link 78 between its projecting lugs 80. The link 78 is pivotally connected to the clevis 28 by a pivot pin 82 carried by the clevis lugs 80. The opposite end of the link 78 carries a spherical bearing 84, similar in construction to the spherical bearing of the bearing assembly 34, having an inner race which is affixed to the inner end 86 of the spring arm 30, to thus allow pivotal movement of the spring arm end 86 relative to the link 78 about a pivot point P3 of the spring arm 30, in any direction about the center of the spherical bearing 84. Alternatively, the inboard end of the spring arm 30 may terminate in a combined spherical and cylindrical bearing assembly, similar to the bearing assembly 42, and carried by the mounting flange 28.

Figure 5:
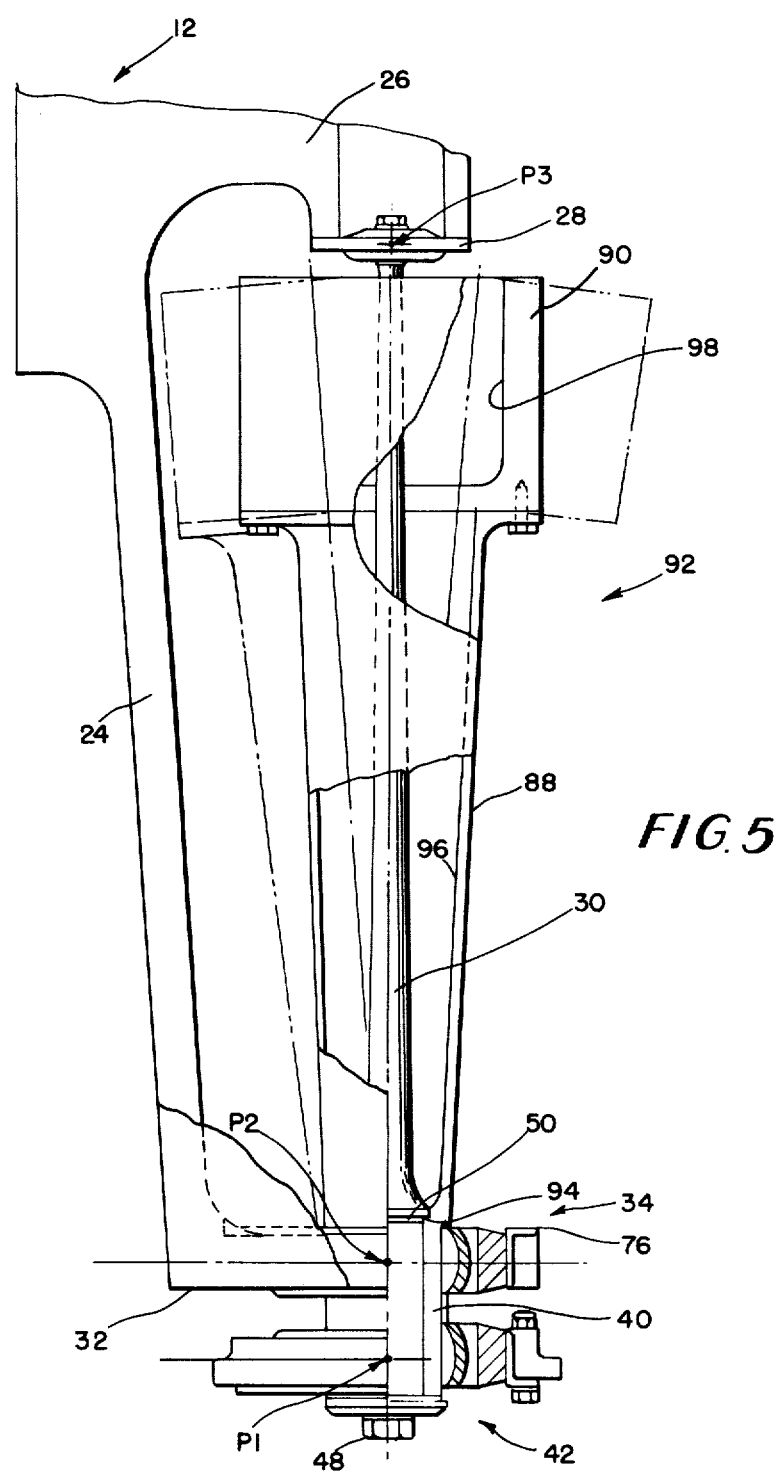
FIG. 5 is a plan view partially in section of a bi-directional vibration isolator of a second embodiment of the invention, mounted in position on a transmission casing arm, but having the inertia arm extending inwardly from the pivot bearings.

A second embodiment of the isolation system according to this invention is illustrated in FIG. 5 and is similar to the arrangement shown in FIGS. 1-3, except that an inertia arm 88, including an inertia mass 90, of a vibration isolator 92 projects radially inwardly from the position of the outer bearing assembly 42 and the inner bearing assembly 34, thereby reducing the overall size of the system but providing the identical function. FIG. 5 shows the inner mounting flange 28 of the transmission casing 12 and the radial arm 24 extending outwardly from the ring portion 26 terminating at the outer flange 32 on which is mounted the inner bearing assembly 34. The spring arm 30 is secured at its inboard end to the transmission casing ring portion 26 at the attachment to the flange 28. The outer end of the spring arm 30 includes a mounting surface 50 which abuts a shoulder 94 formed on the inertia arm 88. The thickened end portion 40 furnishes a surface that abuts the mechanical attachment 48, which engages the threads formed on the spring arm 30.

The mounting flange 16 of the helicopter fuselage houses the outer bearing assembly 42, which is constructed identically as previously described, and furnishes a fuselage-based support for the isolator 92. In this embodiment, however, the inertia arm 88 has a central bore 96 formed therein which is generally conical in shape, widening at its inboard end to permit flexural movement of the inertia arm 88 and of the inertia mass 90 that is unobstructed by possible contact with the spring arm 30. The inertia arm 88 and mass 90 are formed with central bores 96 and 98 into which the spring arm 30 is fitted.

Mounting flange 32 houses the inner bearing assembly 34 and terminates in the angle portion having the oustanding leg 76 which provides a surface for mounting the bearing assembly 34 on the flange 32.

The attachment of the inner end of the spring arm 30 to the flange 28 of the transmission casing ring 26 is similar to the attachment previously described and provides an accommodation to the shortening effect of the spring arm 30 due to flexural displacements occurring during operation.

Figure 6:
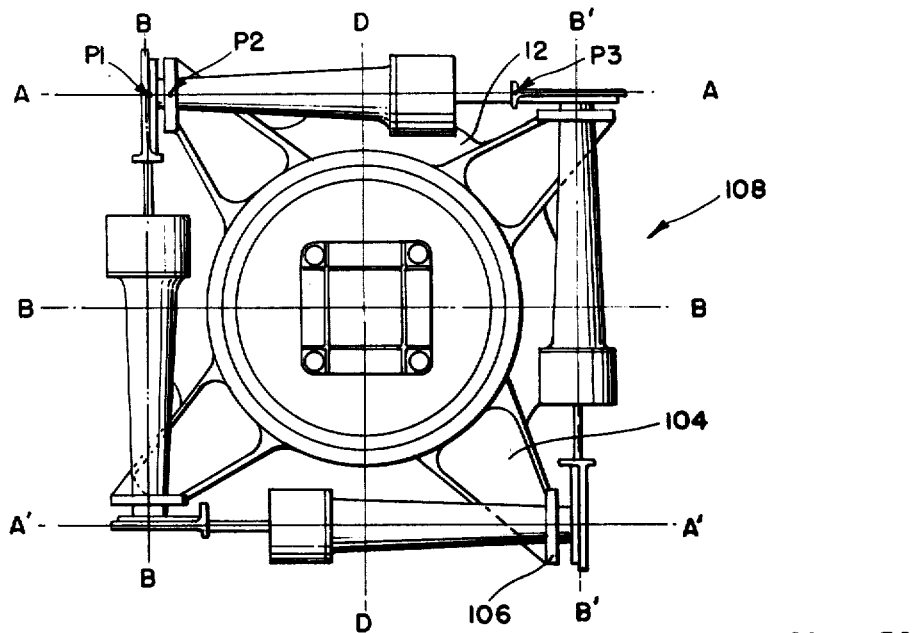
FIG. 6 is a plan view of a helicopter rotor-transmission assembly and isolation system according to a third embodiment of this invention.
Figure 7:
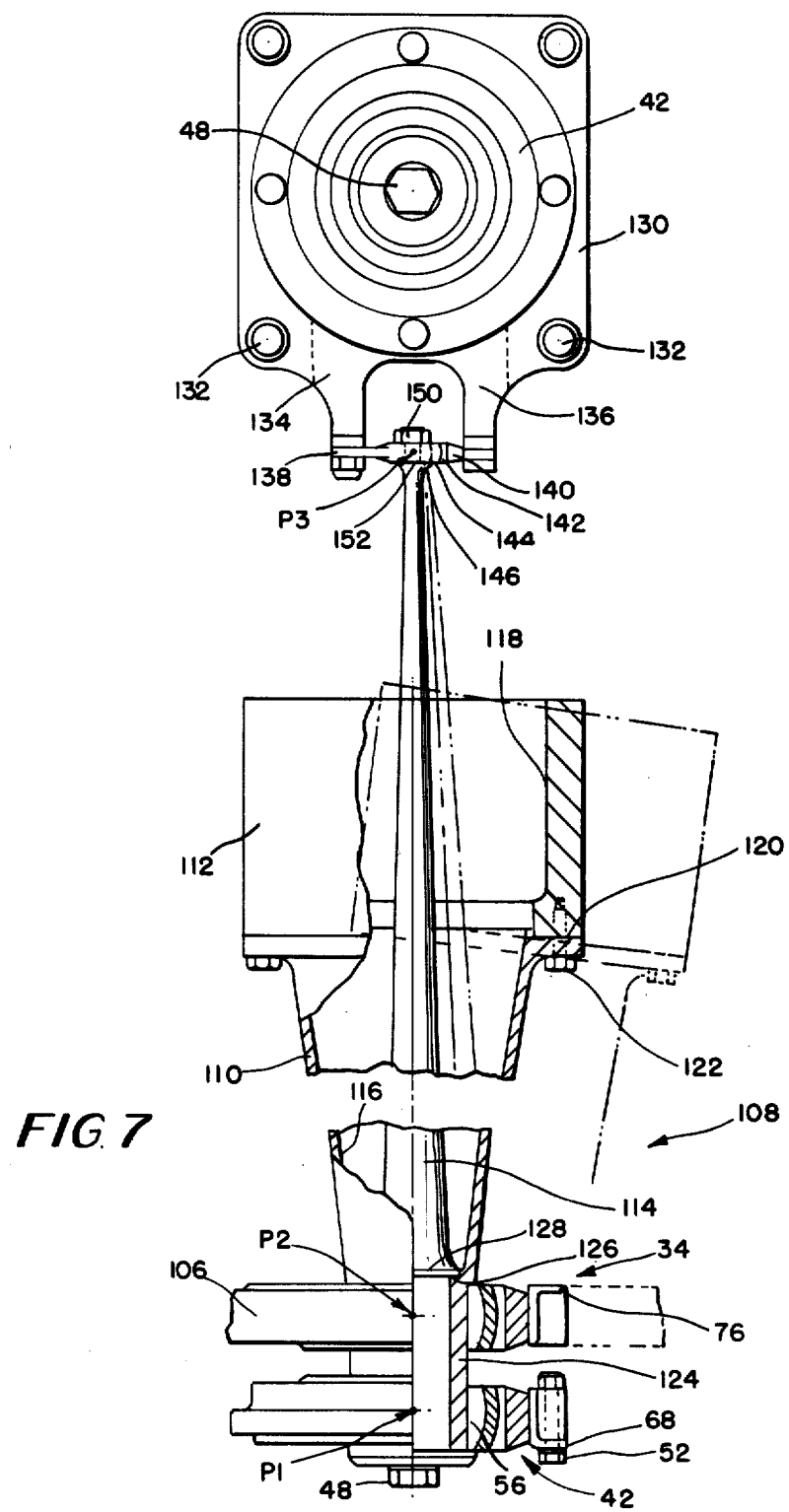
FIG. 7 is a side elevation view partially in section of one bi-directional vibration isolator of the isolation system of FIG. 6, mounted in position on a transmission casing arm.

Still another arrangement of the isolation system providing further reduction in overall size is illustrated in FIGS. 6 and 7. In this case, four transmission arms 104 extend radially outward at 90° intervals from the rotor center, and terminate in four outer mounting flanges 106, respectively. Each mounting flange 106 carries a bearing assembly 34 of a vibration isolator 108, similar to the vibration isolator 92 described above. Two of the isolators 108 are disposed on opposite sides of the transmission casing 12 and extend in opposite directions along parallel, horizontal axes A—A and A'—A', respectively. The other two isolators 108 extend in opposite directions along respective, parallel, horizontal axes B—B and B'—B' orthogonal to the axes A—A and A'—A'. As depicted in FIG. 6, the axes A—A and A'—A' are arbitrarily arranged parallel to the helicopter pitch-axis B—B; are arranged parallel to the helicopter roll-axis D—D.

FIG. 7 shows one of the vibration isolators 108 according to this embodiment. An inertia arm 110 and inertia mass 112 are arranged coaxially with a spring arm 114 fitted within the respective bores 116, 118 of the inertia arm 110 and inertia mass 112. The inertia mass 112 abuts a flange 120 formed on the outer end of the inertia arm 110 and is attached to the inertia arm 110 by mechanical attachments 122, that join the inertia mass 112 to the flange 120. A thickened end portion 124 of the inertia arm 110 furnishes a mounting shoulder 126 which is brought into abutting engagement with a flange portion 128 of the spring arm 114 when the attachment 48 is drawn-up on the end portion 124.

The inner bearing assembly 34 and outer bearing assembly 42 are constructed identically as was previously described and are similarly adapted to receive the outer cylindrical surface of the end portion 124 within their inner races. In this case, the outstanding leg portion 76 of the inner bearing assembly 34 is attached to the mounting flange 106 of the transmission arm 104, in which flange 106 the inner bearing assembly 34 is fitted. As previously described, the inner race 56 of the outer bearing assembly 42 is adapted to receive the end portion 124 and the outstanding leg 68 is attached by bolts 52 to the mounting fitting 130, which is secured to the helicopter fuselage by an additional bolted attachment 132 that extends through the thickness of the fitting 130.

The fuselage mounting fittings 130 are located at each of the corners of the rotor and provide the means whereby the outer bearing 42 is secured to the fuselage, and the second function of securing the end of the spring arm 114 of the adjacent isolator 108 to the fuselage. The mounting fitting 130 has an upper finger 134 and a lower finger 136 projecting laterally and generally parallel to the axis of the spring arm 114 which carries a vertically extending pivot pin 138. One end of a foreshortening link 140 is pivotally connected to the mounting fitting 130 between the upper and lower fingers 134, 136. An opposite end of the foreshortening link 140 carries a laminated, spherical bearing 142 which is generally of the same type and construction as the spherical bearings of the inner bearing assembly 34 and outer bearing assembly 42. The inner race 144 of bearing 142 has a cylindrical bore therethrough adapted to receive the end portion 146 of the spring arm 114, which portion 146 provides screw threads that are engaged by a nut 150. When the nut 150 is tightened, it bears on the inner race 144 at one axial end, the opposite axial end being drawn-up upon a shoulder 152 of the spring arm 114.

Figure 8:
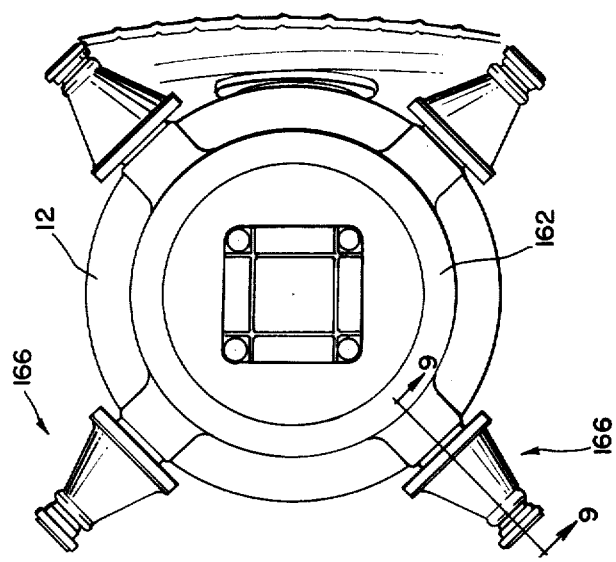
FIG. 8 is a plan view of a helicopter rotor-transmission assembly and a fourth isolation system that reduces the size of the isolators by transmitting rotor loads from the transmission to the fuselage through the spring arm, the isolator carrying only the vibratory loads induced in the isolation system.
Figure 9:
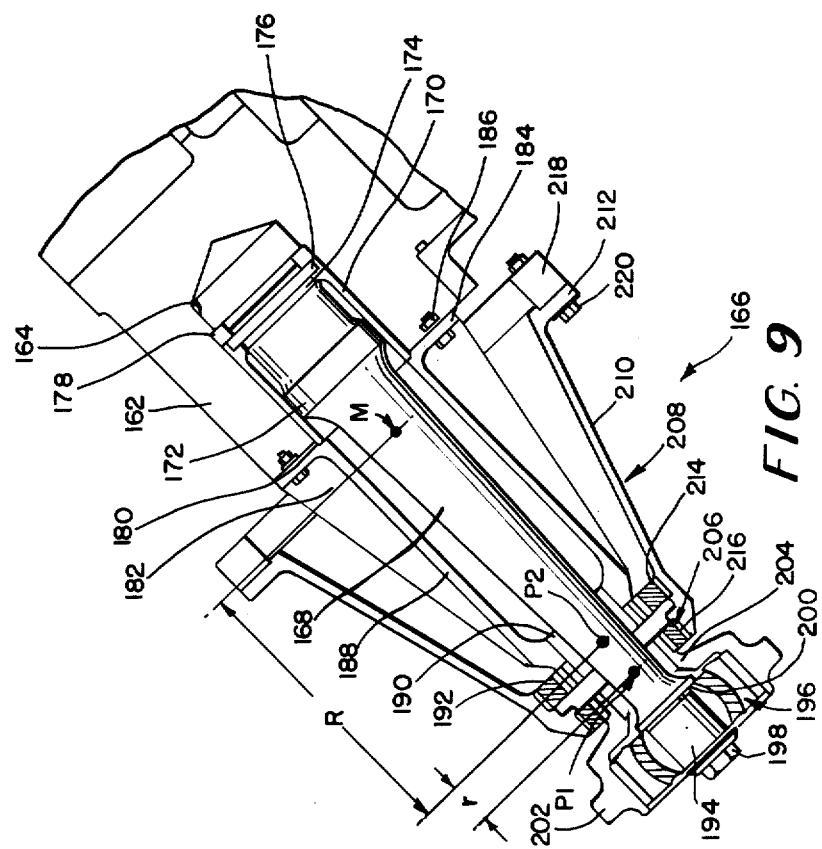
FIG. 9 is a longitudinal cross-section of one vibration isolator taken at plane 8—8 of the system of FIG. 8.

A further arrangement of an isolation system according to this invention is set out in the assembly of FIG. 8 and a variation of that assembly as illustrated in FIG. 9. FIGS. 8 and 9 show a transmission casing ring portion 162 into which are formed four bores 164 that are directed radially outwardly at 90° intervals and have co-linear center lines with the center lines of four respective vibration isolators 166.

The inner ends of four spring arms 168 are securely affixed to the transmission casing ring portion 162 within the four bores 164, respectively. For example, each bore 164 may have a sleeve 170 fitted therein made of high bearing strength material. Within each sleeve 170, the inner end of spring arm 168 is fitted and arranged to extend within the bore 164 a sufficient distance so that an outer land 172 bears upon the inner surface of the sleeve 170 and an inner land surface 174 abuts the inner surface of the sleeve 170 at its radially inner end. A pin 176 fits within a diametral hole that is formed through the walls of the sleeve 170 and through the spring arm 168. The pin 176 retains the arm 168 within the sleeve 170, and is prevented from axial movement within the bore 164 by being axially bound between a shoulder 178 and a recess 180 formed on the mounting surface of a transmission arm 182, which are attached to the transmission case at the mounting flanges 184 by the attachment bolts 186.

A cylindrical shell extension 188 of the transmission arm 182 extends outwardly from the flanges 184 and terminates in a cylindrical end portion 190 that is symmetric about the longitudinal axis of the isolator 166 and provides a surface onto which an inner bearing assembly 192 is mounted. The bearing assembly 192 is constructed similar to the previously described bearing assembly 42, except the relative positions of the cylindrical and spherical bearings are reversed, i.e., the cylindrical bearing is concentrically disposed within, rather than about, the spherical bearing.

The spring arm 168 has a tapered conical outer surface that terminates at a cylindrical end portion 194. A bearing assembly 196, which is similar in construction to the bearing assembly 42 and includes a spherical bearing concentrically disposed within a cylindrical bearing, is fitted over the end portion 194, and a mounting bolt 198, which engages screw threads tapped in the body of the spring arm 168, locates the bearing assembly 196 between a shoulder 200 and the face of the bolt 198. A lug 202 that is secured to the fuselage structure encapsulates the bearing assembly 196 and supports the outer end of the spring arm 168.

Since the bearing assembly 196 allows the spring arm 168 to freely displace axially and to rotate about any axis, the lug 202 is seen to provide support for the spring arm 168 only in the transverse displacement sense. Therefore, rotor loads carried by the rotor shaft 14 to the transmission casing 12 and loads developed within the transmission casing 12 itself are readily transmitted along the spring arms 168 to the lug 202 where they are ultimately distributed to the fuselage structure. In this way, the rotor-transmission assembly can be seen to be resiliently supported by the fuselage at each isolator location on the spring arms 168 whose bending elasticity furnishes the resiliency.

The fuselage lugs 202 have a cylindrical mounting portion 204 extending radially inwardly, about which is mounted a bearing assembly 206 which is similar in construction to the above-described bearing assembly 192 and includes an inner cylindrical bearing concentrically disposed within an outer spherical bearing. The bearing assembly 206 supports the outer end of an inertia arm 208, which includes a conical shell portion 210 that extends outwardly from a mounting flange 212 to outer races 214, 216 of the bearings 192, 206 respectively. An inertia mass 218 is located on and attached to the mounting flanges 212 by a bolt attachment 220. The isolator mass 218 is, therefore, supported from the inertia cone 210, which receives support from the fuselage at the lug 202 and from the transmission shell extension 188.

Since the outer races 216, 214 of the bearing assemblies 206, 192 are carried by the inertia arm 208, the spherical bearings of the bearing assemblies 206, 192 must be the outer bearings of these bearing assemblies 206, 192 in order to fix the first and second pivot points, P1, P2, respectively, of the inertia arm 208, and to maintain a constant R/r ratio, which is required for the vibration isolation system to achieve complete vibration isolation at the characteristic vibration frequency of the helicopter, as explained hereinafter. If bearing assemblies constructed identically to the bearings 42 or 34 were used instead of the bearing assemblies 206, 192, the distance r between the pivot points P1, P2, and consequently the ratio R/r, would vary whenever the transmission casing 12 moved relative to the fuselage along the axis of the isolator 166, and it would not be possible to consistently achieve complete vibration isolation at the vibration frequency.

The cylindrical inner bearings of the bearing assemblies 192 and 206 allow linear movement of the transmission casing 12 with respect to the fuselage along the longitudinal axis of the isolator 166 without changing the R/r ratio, and also allow linear movement of the transmission casing 12 with respect to the fuselage orthogonally of the longitudinal axis of the isolator 166, without binding of the inertia arm 208 within the spherical bearings of the bearing assemblies 34 and 42 of the previously described embodiments, if desired, only one of the bearing assemblies 192, 206 need include a cylindrical bearing to allow this linear movement of the transmission casing 12 with respect to the fuselage.

Figure 10:
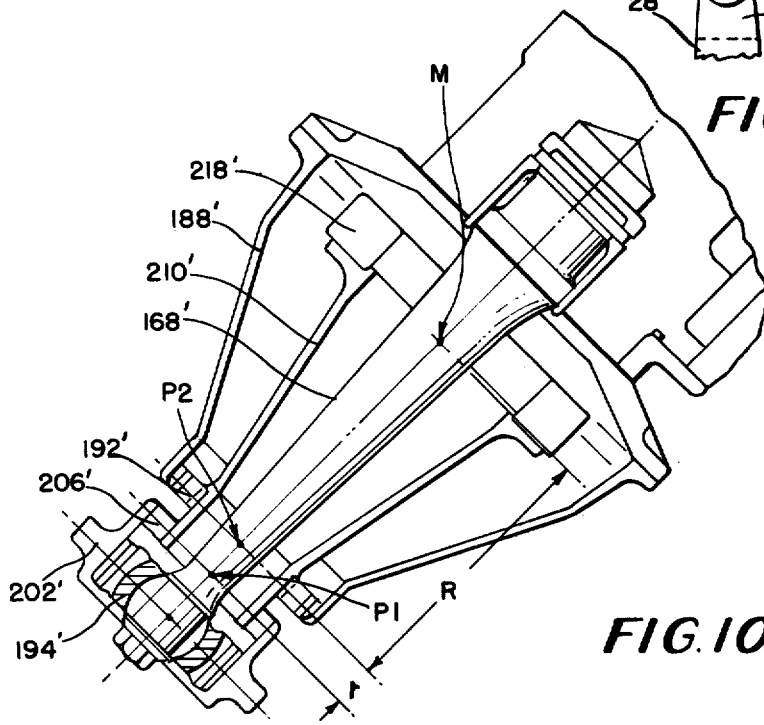
FIG. 10 is an alternative arrangement of the isolation system of FIG. 9.

A modification of this isolation system wherein the shell extension 188' of the transmission casing 12 is positioned outside of the inertia cone 210' and its attached inertia mass 218' is shown in FIG. 10. In this instance, the lug 202' supports the spring arm 168', but provides an outer mounting surface for the bearing assembly 206' that is interposed between the lug 202' and the inertia cone 210'. The bearing assembly 192' is interposed between the transmission shell extension 188' and the inertia cone 210'. Since the inertia 210' is affixed to the inner races of the bearing assemblies 202' and 206', these bearing assemblies 202' and 206' are constructed similar to the previously described bearing assembly 42, having an inner spherical bearing concentrically disposed within an outer cylindrical bearing, to thus maintain a predetermined spacing r between the pivot points P1, P2 of the inertia arm 208' about the transmission casing 12 and the fuselage, respectively. As previously described, the spring arm 168' is supported at a universal attachment at its outer end provided by bearing 194'. Rotor and transmission loads are transmitted to the fuselage by the spring arms 168' which resiliently support the rotor and transmission by reason of the elastic bending nature of the spring arms 168'.

In the embodiments of FIGS. 8-10, the inertia arm bearings 192 and 206, 192' and 206', carry only vibratory inertia loads, and all rotor loads (steady and vibratory) are reacted through the four bearings 194, 194' to the fuselage. In effect, the four transmission legs 24 of the embodiments of FIGS. 1-7 are replaced by the four spring arms 168 or 168'. Since the bearings 192 or 192' pivotally connecting the inertia arm 208 or 208' to the transmission casing 12 reacts only vibratory load, the transmission legs 188 or 188' can be of much lighter construction and weight than the transmission legs 24, or 104 of the embodiments of FIGS. 1-7. Also, the embodiment of FIG. 10 includes the further advantage of having its two-directional vibration isolators 166' almost completely enclosed within adjacent fuselage and transmission casing members.

In all of the embodiments of the invention described above, the disposition of the vibration isolators, relative to the transmission casing 12 and the fuselage could be reversed. For example, in the embodiment of FIGS. 1-3, the spring arm 30 could be carried by the fuselage rather than the transmission casing 12, in the same manner as described for a single direction vibration isolator in my above-referenced U.S. Pat. No. 4,140,028.

The vibration isolators 22, 92, 108, 166 and 166' operate in the same manner as the vibration isolators described in the above-mentioned U.S. Pat. Nos. 4,088,042 and 4,140,028 incorporated herein by reference, except each vibration isolator described herein operates in response to linear vibratory forces acting in any direction orthogonal to the longitudinal axis of the isolator, in contrast to the vibration isolators disclosed in the U.S. Pat. Nos. 4,088,142 and 4,140,028, each of which operate in response to linear vibratory forces acting in a single direction.

In designing a vibration isolator, the parameters of the isolator must be adjusted so that at the fuselage pivot point 42 the inertia forces developed by the inertia arm 38 in response to linear vibratory displacement in a plane orthogonal to the axis defined by the pivot points 34, 84 are equal and opposite to the vibratory forces developed through the spring arm 30 for a given vibration frequency. When the isolator is so designed, the fuselage undergoes zero displacement in response to these linear vibratory forces.

The following general tuning equation, which is explained in detail in the above-mentioned U.S. Pat. No. 4,088,042, is applicable to the vibration isolators 166, 166' in which the inertia arms 208, 208' and the spring arms 168, 168' are separately connected between the transmission casing 12 and the fuselage:

$$\omega^2 = \frac{K_L}{\frac{I}{r^2} + m_i \frac{R}{r}\left[\frac{R}{r} - 1\right]}$$

where:
 $\omega$ = frequency of vibration at which the spring force is equal to the inertia force $m_i$ = mass of the inertia arms 208, 208'
 $I$ = moment of inertia of the inertia arms 208, 208'
 $R$ = length between pivot point P1 and the center of gravity M of $m_i$
 $r$ = length between pivot points P1 and P2
 $K_L$ = spring constant of a linear spring equivalent to the cantilevered spring arms 168, 168'

Since the vibration isolators 22, 92 and 108, have spring arms which are attached to their inertia arms, the above general tuning equation is modified to include the mass of the attached spring arm in calculation the inertia forces developed, by displacement of the inertia arm. The following tuning equation, which is derived and described in detail in the above-referenced U.S. Pat. No. 4,140,028, can be used in selecting the designs parameter of the vibration isolators 22, 92 and 108:

$$\omega^2 = \frac{K_L}{\frac{I}{r^2} + m_i \frac{R}{r}\left[\frac{R}{r} - 1\right] + \frac{L m_s}{15 r}}$$

where:
 L = length of spring arm 30 between pivot points P2 and P3
 $m_s$ = mass of spring arm 30

Since the spring arm 30 of each isolator 22, 92, and 108 is tapered to have a large cross-section adjacent the pivot point P2, in deriving the above tuning equation, the distance between the center of gravity M of the spring arm 30 and the pivot point P2 was assumed to be 7/16 times the length L of the spring arm. For other spacings of the center of gravity M, the tuning equation can be derived as explained in the above-referenced U.S. Pat. No. 4,140,028.

Using the above equation or a similarly derived equation, and knowing the characteristic vibration frequency for a particular helicopter system, the mass, geometry and spring rate parameters of the vibration isolators can be readily selected to provide anti-resonance, and thus effect essentially complete isolation of linear vibration forces, at the characteristic vibration frequency of the helicopter.

In the vibration isolation system shown in FIGS. 1-4, all six vibration axes of the helicopter are isolated by the four symetrically spaced, bi-directional vibration isolators 22, each of which are arranged orthogonally to the two adjacent isolators 22. All four vibration isolators respond fully to a linear vibratory force acting in the direction of the vertical axis E—E; hence, the system spring constant, or system stiffness, is four times the spring constant of each isolator 22 for any linear vertically acting vibratory force.

In the case of a linear vibratory force acting in the direction of the lateral axis C—C, or in the direction of the longitudinal axis, D—D, each vibration isolator 22 will respond to the vectorial portion of the vibratory force acting in a direction orthogonal to the longitudinal axis A—A or B—B of the isolator 22, which will be the vibratory force times the sine of the angle between the linear direction of the vibratory force and the longitudinal axis A—A or B—B of the isolator 22. For example, when the vibratory force acts in the direction of the common longitudinal axis A—A of one pair of oppositely disposed isolators 22, this pair of isolators 22 will not respond, but the other pair of oppositely disposed isolators 22 will fully respond. When the vibratory force acts in a direction intermediate the two common axes A—A, B—B of the isolators 22 and in the plane of the two common axes, for example, in the direction of the lateral axis C—C or the longitudinal axis D—D, one pair of oppositely disposed isolators will respond to the vectorial portion of the vibratory force acting along the axis A—A, and the other pair of oppositely disposed isolators 22 will respond to the vectorial portion of the vibratory force acting orthogonally to the first vectorial portion along the axis B—B. Thus, for a linear vibratory force acting either in the direction of the lateral axis A—A, in the direction of the longitudinal axis, B—B, or in any direction in the plane of the lateral and longitudinal axes A—A and B—B, the system spring constant is twice the spring constant of each isolator 22.

In the case of a vibratory moment, acting in one direction about the yaw axis E—E, each pair of oppositely disposed vibration isolators exert equal and opposite horizontally acting inertia forces at their respective fuselage pivot points P2 to produce an inertia moment about the yaw axis in an opposite direction or rotation from that of the yaw vibratory moment, which is proportional to the square of the distance d between the fuselage pivot points P2 of each pair of diametrically opposite isolators 22. Thus, the system angular spring rate will be proportional to $2d^2$.

In the case of a vibratory moment acting in one direction of rotation about a particular horizontal axis which is disposed at an angle $\alpha$ with the horizontal axis A—A, the pair of vibration isolators disposed along the horizontal axis A—A exert equal and opposite vertical acting inertia forces at their respective fuselage pivot points P2, to produce an inertia moment about the particualr horizontal axis in an opposite direction of rotation to that of the vibratory moment which is proportional to $[d \sin \alpha]^2$. Also, the pair of vibration isolators disposed along the horizontal axis B—B exert equal and opposite vertical acting forces at their respective fuselage pivot points P2 to produce another inertia moment about the particular horizontal axis in an opposite direction of rotation to that of the vibratory moment which is proportional to $[d \sin 90° - \alpha]^2$, or $[d \cos \alpha]^2$. Thus, the sum of the inertia moments about the particular horizontal axis will be proportional to $[d \sin \alpha]^2 + [d \cos \alpha]^2$, or $d^2[\sin \alpha^2 + \cos \alpha^2]$. Since $\sin \alpha^2 + \cos \alpha^2 = 1$, the sum of the inertia moments about the particular horizontal axis will be proportional to $d^2$. Thus, the system angular spring rate, or rotational stiffness, for yaw vibratory moments is twice the system angular spring rate for roll or pitch vibratory moments.

The vibration isolation systems, which are shown in FIGS. 5, 6 and 7, 8 and 9, and 10, and described herein, and which include four vibration isolators arranged similarly to the four vibration isolators of the system of FIGS. 1-4, operate in the same manner as the system of FIGS. 1-4 described above to eliminate rotor vibration in all six axes of the helicopter—vertical, lateral, longitudinal, pitch, roll and yaw. Each of these vibration isolation systems provides a vertical stiffness twice as high as the in-plane stiffness, and a rotor torque stiffness twice as high as the pitch or roll stiffness.

While these various vibration isolation systems have been described herein for use in helicopters, they are not limited to such use and may be used generally to isolate a body from linear and angular vibratory forces generated by a vibrating mass coupled to the body.

What is claimed and desired to be secured by Letters Patent of the United States is:

1. In a vibration isolator for connecting a body to a vibrating mass with minimum transfer of vibratic therebetween, which has a longitudinal axis and which includes elongated spring means for coupling vibratory forces between the vibrating mass and the body, and inertia means coupled between the vibrating mass and the body for applying forces to the body which substantially attenuate vibratory forces of a predetermined frequency coupled through the spring means, the improvement comprising:
   an elongated inertia arm having opposite ends and having first and second pivot points which are spaced apart along the axis of the vibration isolator;
   first pivot means, disposed intermediate the inertia arm and the vibrating mass, for allowing pivotal movement of the inertia arm with respect to the vibrating mass, about the first pivot point of the inertia arm in any direction;
   second pivot means, disposed intermediate the inertia arm and the body, for allowing pivotal movement of the inertia arm, with respect to the body, about the second pivot point of the inertia arm in any direction; and
   means for attaching said spring means coaxially to said inertia arm.

2. A vibration isolator, as described in claim 1, wherein the spring means comprises:
   an elongated spring arm, having a first end and a second end, the first end being affixed to one of two members, the two members being the body and the vibrating mass; and
   pivot means, disposed between the second end of the spring arm and the other of the two members, for pivotally connecting the spring arm to the other of the two members.

3. A vibration isolator, as described in claim 2, wherein the one of the two members is the vibrating mass.

4. A vibration isolator, as described in claim 2, wherein the pivot means comprises a bearing assembly which includes two concentrically arranged bearings, one bearing being a spherical bearing and the other bearing being a cylindrical bearing.

5. A vibration isolator, as described in claim 2, wherein the inertia arm defines an axial opening therethrough, through which the spring arm axially extends, and the first pivot means of the inertia means includes a bearing assembly which comprises:
   an inner, cylindrical bearing having an inner race carried by the vibrating mass; and
   an outer, spherical bearing, concentrically disposed about the inner cylindrical bearing and having an outer race carried by the inertia arm.

6. A vibration isolator, as described in claim 5, wherein the first pivot means comprises:
   an outer, spherical bearing having an outer race carried by the inertia arm; and
   an inner, cylindrical bearing, concentrically arranged within the outer spherical bearing and having an inner race carried by the vibrating mass.

7. A vibration isolator, as described in claim 5, wherein the second pivot means comprises:
   an outer spherical bearing having an outer race carried by the inertia arm; and
   an inner cylindrical bearing, concentrically arranged within the outer spherical bearing and having an inner race carried by the body.

8. A vibration isolator, as described in claim 5, wherein the inertia arm is symetrically disposed about the vibration isolator axis, and has a center of gravity axially disposed between the first end of the spring arm and the first pivot means.

9. A vibration isolator, as described in claim 8, wherein the second pivot means is axially disposed between the first pivot means and the spring arm pivot means.

10. A vibration isolator, as described in claim 1, wherein the elongated spring means comprises:
an elongated spring arm, having a first end attached to one end of the inertia arm by said means for attaching and a second end which is pivotally connected to the vibrating mass; and
third pivot means, disposed between the second end of the spring arm and the vibrating mass, for allowing pivotal movement of the second end of the spring arm, with respect to the vibrating mass, in any direction about a third pivot point.

11. A vibration isolator, as described in claim 10, wherein the third pivot means comprises a bearing assembly which includes two concentrically arranged bearings, one bearing being a spherical bearing and the other bearing being a cylindrical bearing.

12. A vibration isolator, as described in claim 10, wherein the vibrating mass further comprises a foreshorting link having one end pivotally connected for rotation about an axis of the vibrating mass which is orthogonal to the vibration isolator axis, the foreshorting link having an opposite end carrying the third pivot means.

13. A vibration isolator, as described in claim 12, wherein the third pivot means comprises a spherical bearing, having an outer race carried by the foreshorting link and an inner race disposed about the second end of the spring arm.

14. A vibration isolator, as described in claim 10, wherein the first pivot means is disposed intermediate the second pivot means and the first end of the spring arm.

15. A vibration isolator, as described in claim 14, wherein the opposite end of the inertia defines an axial bore through which the spring arm extends, and the inertia arm has a center of gravity which is disposed between the first and second ends of the spring arm.

16. A vibration isolator, as described in claim 14, wherein the second pivot means is disposed between the first pivot means and the center of gravity of the inertia arm.

17. A vibration isolator, as described in claim 10, wherein the first pivot means comprises:
an outer cylindrical bearing having an outer race carried by the vibrating mass; and
an inner spherical bearing, concentrically disposed within the outer cylindrical bearing, and having an inner race carried by the inertia arm.

18. A vibration isolator, as described in claim 17, wherein the second pivot means comprises:
an outer cylindrical bearing having an outer race carried by the body; and
an inner spherical bearing, concentrically arranged within the outer cylindrical bearing, and having an inner race carried by the inertia arm.

19. A vibration isolator, as described in claim 10, wherein the second pivot means comprises:
an outer cylindrical bearing having an outer race carried by the body; and
an inner spherical bearing, concentrically arranged within the outer cylindrical bearing, and having an inner race carried by the inertia arm.

20. A vibration isolation system for isolating a body from linear vibratory forces acting along three mutually orthogonal axes, and rotational vibratory forces acting about said three mutually orthogonal axes, said vibratory forces being generated by a vibrating mass coupled to said body, wherein the vibration isolation system comprises:
a plurality of elongated vibration isolators, each vibration isolator defining in its elongated direction an axis which intersects the center of the three mutually orthogonal axes and including:
spring means for coupling the linear and rotational vibratory forces between the vibrating mass and the body,
an inertia arm having opposite ends, having first and second pivot points which are spaced apart along the axis of the vibration isolator,
first pivot means, disposed between the inertia arm and the vibrating mass, for allowing pivotal movement of the inertia arm with respect to the vibrating mass, in any direction about the first pivot point of the inertia arm, and
second pivot means, disposed between the inertia arm and the body, for allowing pivotal movement of the inertia arm with respect to the body, in any direction about the second pivot point of the inertia arm.

21. A vibration isolation system, as described in claim 20, in which the plurality of vibration isolators comprises:
first and second vibration isolators, symetrically disposed on opposite sides of the center of the three mutually orthogonal axes, the inertia arms of the first and second vibration isolators extend in opposite directions, and the second pivot points of the first and second vibration isolators are diametrically opposite and equidistant from the center of the three mutually orthogonal axes.

22. A vibration isolation system, as described in claim 21, in which the plurality of vibration isolators further comprises:
third and fourth vibration isolators, symetrically disposed on opposite sides of the center of the three mutually orthogonal axes and orthogonal to the axes of the first and second vibration isolators, the inertia arms of the third and fourth vibration isolators extend in opposite directions, and the second pivot points of the third and fourth vibration isolators are diametrically opposite and at the same distance from the center of the three mutually orthogonal axes as the second pivot points of the first and second vibration isolators.

23. A vibration isolation system, as described in claim 22, wherein the axes of the first and second vibration isolators are collinear, and the axes of the third and fourth vibration isolators are collinear.

24. A vibration isolation system, as described in claim 23, wherein the spring means of each vibration isolator comprises:
an elongated spring arm, having a first end and a second end, the first end being affixed to one of two members, the two members being the body and the vibrating mass; and
pivot means, disposed between the second end of the spring arm and the other of the two members, for pivotally connecting the spring arm to the other of the two members.

25. A vibration isolation system, as described in claim 24, wherein the one of the two members to which the first end of each spring arm is affixed is the vibrating mass.

26. A vibration isolation system, as described in claim 24, wherein each pivot means comprises a bearing assembly which includes two concentrically arranged bearings, one bearing being a spherical bearing and the other bearing being a cylindrical bearing.

27. A vibration isolation system, as described in claim 24, wherein the inertia arm of each vibration isolator defines an axial opening therethrough, through which the spring arm axially extends, and the first pivot means of each vibration isolator includes a bearing assembly which comprises:
   an inner, cylindrical bearing having an inner race carried by the vibrating mass; and
   an outer, spherical bearing, concentrically disposed about the inner cylindrical bearing and having an outer race carried by the inertia arm.

28. A vibration isolation system, as described in claim 27, wherein the first pivot means of each vibration isolator comprises:
   an outer, spherical bearing having an outer race carried by the inertia arm; and
   an inner, cylindrical bearing, concentrically arranged within the outer spherical bearing and having an inner race carried by the vibrating mass.

29. A vibration isolation system, as described in claim 27, wherein the second pivot means of each vibration isolator comprises:
   an outer spherical bearing having an outer race carried by the inertia arm; and
   an inner cylindrical bearing, concentrically arranged within the outer spherical bearing and having an inner race carried by the body.

30. A vibration isolation system, as described in claim 22, wherein the spring means of each vibration isolator comprises:
   an elongated spring arm, having a first end affixed to one end of the inertia arm and a second end which is pivotally connected to the vibrating mass; and
   third pivot means, disposed between the second end of the spring arm and the vibrating mass, for allowing pivotal movement of the second end of the spring arm, with respect to the vibrating mass, in any direction about a third pivot point.

31. A vibration isolation system, as described in claim 30, wherein the third pivot means of each vibration isolator comprises a bearing assembly which includes two concentrically arranged bearings, one bearing being a spherical bearing and the other bearing being a cylindrical bearing.

32. A vibration isolation system, as described in claim 30, wherein the first pivot means of each vibration isolator comprises:
   an outer cylindrical bearing having an outer race carried by the vibrating mass; and
   an inner spherical bearing, concentrically disposed within the outer cylindrical bearing, and having an inner race carried by the inertia arm.

33. A vibration isolation system, as described in claim 30, wherein the second pivot means of each vibration isolator comprises:
   an outer cylindrical bearing having an outer race carried by the body; and
   an inner spherical bearing, concentrically arranged within the outer cylindrical bearing, and having an inner race carried by the inertia arm.

34. A vibration isolation system for isolating a body from linear vibratory forces acting along three mutually orthogonal axes, and rotational vibratory forces acting about said three mutually orthogonal axes, said vibratory forces being generated by a vibrating mass coupled to said body, wherein the vibration isolation system comprises:
   two elongated collinear vibration isolators disposed such that:
   (i) they extend in opposite directions relative to the center of the three mutually orthogonal axes; and
   (ii) the collinear axis intersects the center of the three mutually orthogonal axes.

35. A vibration isolation system as described in claim 34, wherein each vibration isolator includes spring means and an inertia arm aligned so that said alignment defines said collinear axis.

36. A vibration isolation system for isolating a body from linear vibratory forces acting along three mutually orthogonal axes, and rotational vibratory forces acting about said three mutually orthogonal axes, said vibratory forces being generated by a vibrating mass coupled to said body, wherein the vibration isolation system comprises:
   four elongated vibration isolators disposed such that:
   (i) they comprise two collinear sets with the vibration isolators in each set extending in opposite directions relative to the center of the three mutually orthogonal axes; and
   (ii) the collinear axes intersect the center of the three mutually orthogonal axes.

37. A vibration isolation system, as described in claim 36, wherein each vibration isolator includes spring means and an inertia arm aligned so that said alignment defines a respective collinear axis.

* * * * *